United States Patent [19]

Long

[11] Patent Number: 4,534,035
[45] Date of Patent: Aug. 6, 1985

[54] TANDEM ELECTRIC DISCHARGES FOR EXCITING LASERS

[75] Inventor: William H. Long, Torrance, Calif.

[73] Assignee: Northrop Corporation, Hawthorne, Calif.

[21] Appl. No.: 521,713

[22] Filed: Aug. 9, 1983

[51] Int. Cl.³ ............................................. H01S 3/097
[52] U.S. Cl. ........................................ 372/85; 372/82; 372/86; 372/61; 315/186; 315/188
[58] Field of Search ................ 372/87, 55, 86, 85, 372/97, 82; 315/186–188; 313/601, 607

[56] References Cited

U.S. PATENT DOCUMENTS

| | | | |
|---|---|---|---|
| 2,056,619 | 10/1936 | Reger et al. | 315/186 |
| 2,268,512 | 12/1941 | McCarthy | 315/188 |
| 3,324,349 | 6/1967 | Moerkens et al. | 315/188 |
| 3,590,314 | 6/1971 | Krusche | 315/186 |
| 4,417,342 | 11/1983 | McKee | 378/87 |

FOREIGN PATENT DOCUMENTS 2444893  4/1976  Fed. Rep. of Germany ...... 315/188

Primary Examiner—William L. Sikes
Assistant Examiner—Léon Scott, Jr.
Attorney, Agent, or Firm—Terry J. Anderson

[57] ABSTRACT

This invention relates to a method and apparatus by which two series-connected glow discharge devices may be connected to a main power supply without interposing an output switch. The two series-connected glow discharge devices may be used within a single laser or in two different lasers which are pumped simultaneously. Both glow discharges may be initiated by a balanced main power supply, a single ended main power supply or a prepulse power supply in conjunction with a main power supply.

4 Claims, 9 Drawing Figures

TANDEM ELECTRIC DISCHARGES FOR EXCITING LASERS

BACKGROUND OF THE INVENTION

1. Field of the Invention

The present invention relates to electrical circuits for supplying power to electrical glow discharge devices. The invention relates especially to circuits for supplying very fast, high power pulses to electric discharge electrodes used to excite gas lasers.

2. Description of the Prior Art

A common application for high power pulsed electric glow discharges is in the excitation or pumping of gas lasers. Generally, the glow discharge is created by applying a voltage across a glow discharge device consisting of a pair of electrodes disposed within an envelope containing the gaseous laser gain medium.

The design of the electrical excitation circuit which supplies current to the discharge electrodes contributes substantially to the overall efficiency of the laser, that is, to the ratio of the laser's optical output power to the electric power consumed by the excitation circuit.

One component of the overall laser efficiency, the efficiency with which the laser gain medium is excited by the electric discharge, is enhanced by minimizing the rise time of the current pulse applied to the discharge electrodes. Another component of the overall laser efficiency, the efficiency of the excitation circuit itself, is enhanced by minimizing power dissipation in each circuit component.

The design of an efficient excitation circuit is complicated by the fact that the voltage required to initiate an electric glow discharge (called the "firing voltage") is much greater than the voltage required to sustain the discharge (called the "sustaining voltage" or "steady-state voltage"). Therefore, the excitation circuit must apply to the discharge electrodes a voltage greater than the predetermined firing voltage for the brief period required to initiate the discharge, and then need only apply a voltage at the lower value needed to sustain the desired level of discharge current for the remaining period in which the discharge is to occur.

Conventional excitation circuits generally consist of a main power supply for supplying the aforesaid voltages and an "output switch" for connecting the power supply to the discharge electrodes. The output switch is needed to disconnect the power supply voltage from the discharge device until the moment the glow discharge is to begin.

The output switch is difficult to design because it must satisfy several requirements: it must conduct the relatively high current of the sustained glow discharge; it must be able to turn on very fast and have a very low inductance to achieve a fast rise time for the discharge current pulse; and it must have a very low "on" resistance to minimize power losses.

The type of switch generally accepted as best satisfying the electrical requirements of an output switch is the multichannel railgap, a sparkgap device typically consisting of a long brass bar positioned parallel to and only a few millimeters from the edge of a long stainless steel blade. However, a serious shortcoming of the railgap is that current flow through the sparkgap progressively erodes the electrodes and deposits electrode material on adjacent dielectric surfaces, so that the railgap has a relatively short lifetime until replacement or repair is required.

Thyratrons and saturable inductors may operate as switches having longer lifetimes than railgaps, but their performance as output switches is inferior because of their slow turn-on speed and high power losses, respectively.

SUMMARY OF THE INVENTION

The present invention is a method and apparatus by which two series-connected glow discharge devices may be connected to a main power supply without interposing an output switch. The present invention overcomes the conventional requirement of an output switch because each glow discharge device effectively acts as an output switch for the other. Thus, the present invention eliminates the problems of power losses in the output switch and the maintenance required by erosion of sparkgap output switches.

The present invention is especially useful when applied to glow discharge excitation or pumping of gas lasers. The two series-connected glow discharge devices may be used within a single laser or in two different lasers which are pumped simultaneously.

DETAILED DESCRIPTION OF THE PREFERRED EMBODIMENTS

Figure 1:
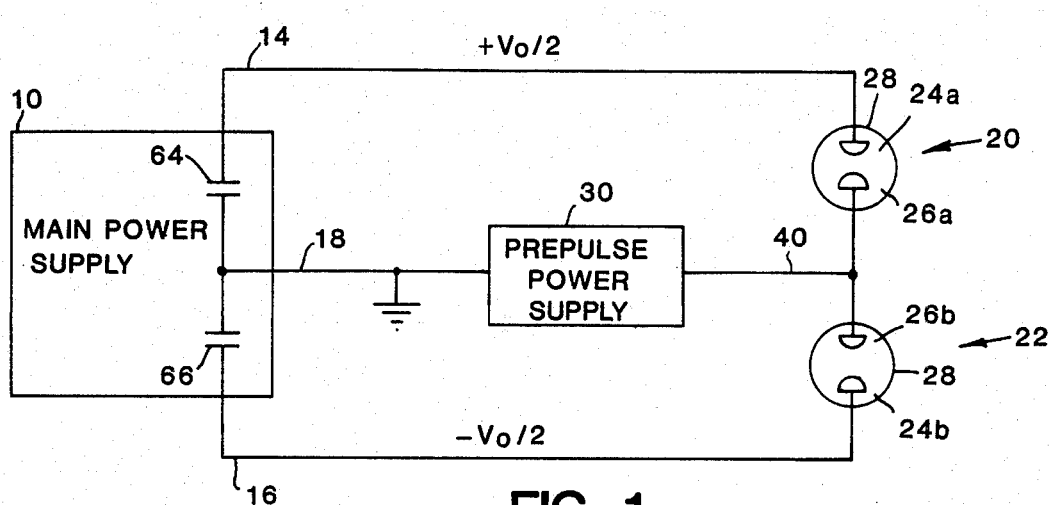
FIG. 1 is a schematic diagram of the preferred embodiment of the invention using a balanced main power supply.
Figure 2:
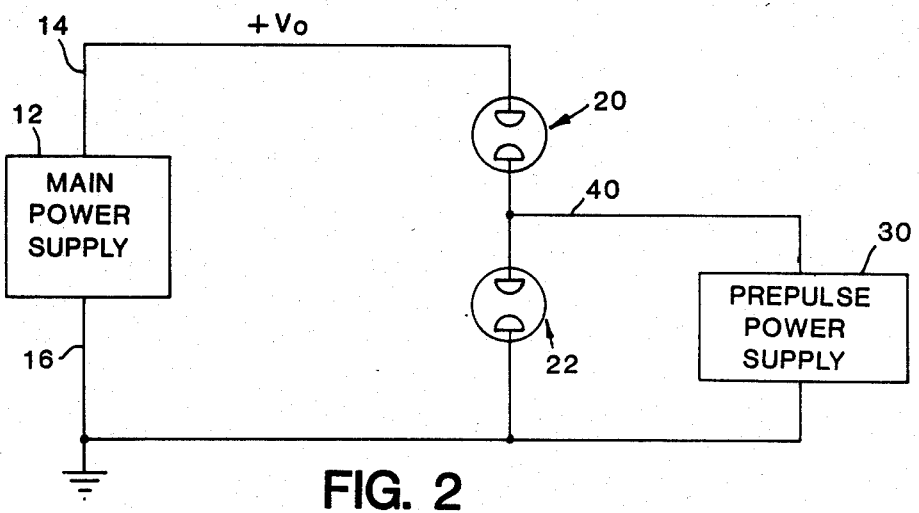
FIG. 2 is a schematic diagram of an alternative embodiment of the invention using a single-ended power supply.

FIGS. 1 and 2 are block diagrams of two alternative embodiments of the present invention using a balanced main power supply 10 and a single-ended main power supply 12, respectively.

In each of the two embodiments, the main power supply 10 or 12 produces a total voltage of $V_o$ between its two output terminals 14 and 16. The balanced power supply 10 shown in FIG. 1 has a center tap 18 connected to ground, so that the voltage at the two terminals 14 and 16 is $+V_o/2$ and $-V_o/2$, respectively, relative to ground. The single-ended power supply 12 shown in FIG. 2 has its second terminal 16 connected to ground, so that the voltage at the first terminal 14 is $+V_o$ relative to ground.

In each of the two embodiments, two conventional glow discharge devices 20 and 22 are electrically connected in series, and the resulting series circuit is connected across the power supply output terminals 14 and 16.

Each conventional glow discharge device 20 and 22 contains a pair of opposing electrodes 24 and 26 within an envelope 28 filled with a gas. The properties of the gas are such that applying a voltage to the electrodes in excess of a characteristic firing voltage (or breakdown voltage) initiates a glow discharge in the gas. As the glow discharge begins, the density of free electrons in the gas increases by a factor of at least $10^6$, causing the electrical resistance of the glow discharge device to decrease by a comparable factor. Current will then begin to flow through the glow discharge device. The current flow will continue as long as the voltage across the device remains greater than a characteristic sustaining voltage which is less than the firing voltage.

Actually, the preceding paragraph oversimplifies the description of the firing voltage, because the firing voltage of a glow discharge device is commonly not a fixed value, but is a function of how long the voltage is applied to the device. A discharge device is characterized by a DC firing voltage which represents the minimum voltage which will eventually initiate a glow discharge in the gas. However, the time delay between the application of voltage to the discharge device and the occurrence of a glow discharge in the device decreases as the applied voltage is increased above the DC firing voltage.

In gas discharge laser applications, it is generally necessary to achieve a risetime of only a few nanoseconds for the discharge current. The voltage required for the glow discharge to occur that fast is commonly much greater than the DC firing voltage. Accordingly, all references herein to the firing voltage of a discharge device are intended to refer to the voltage required to initiate a discharge within the time required by a particular application.

The main power supply 10 or 12 functions as the voltage source which supplies power to the two gas discharge devices 20 and 22 during the times when a glow discharge is taking place. Since the two discharge devices 20 and 22 are connected in series, the main power supply must produce across its output terminals 14 and 16 a voltage equal to the sum of the voltages needed to sustain the desired amount of current flow through the two discharge devices 20 and 22, such voltages being slightly greater than the respective sustaining voltages (defined in the preceding paragraph) of the two discharge devices.

In most applications the two gas discharge devices 20 and 22 will be identical, and this will be assumed to be true in the remainder of this description. In that case, the main power supply output voltage $V_o$ is approximately two times the sustaining voltage of either discharge device.

Since the voltage supplied by the main power supply 10 or 12 is designed to be high enough to sustain, but not to initiate, a glow discharge in devices 20 and 22, a prepulse power supply 30 is used to initiate a glow discharge by applying to each of the discharge devices a voltage pulse, called a "prepulse", greater than the firing voltage of the device. The prepulse must be long enough to initiate current flow through the gas discharge devices, after which time the main power supply 10 or 12 can supply sufficient voltage to sustain the glow discharges.

Since the two discharge devices 20 and 22 remain connected to the main power supply 10 or 12 when the prepulse occurs, the algebraic sum of the signed voltages across the two devices 20 and 22 remains constant; i.e., it remains equal to the main power supply output voltage $V_o$. Therefore, the prepulse power supply 30 must apply oppositely signed prepulse voltages to the two devices. This may be accomplished by connecting one terminal of the prepulse power supply to the junction 40 of the two discharge devices, and connecting the other terminal to any convenient point in the main power supply circuit, this point preferably being ground as shown in FIGS. 1 and 2.

To illustrate how the prepulse power supply 30 applies across each of the discharge devices 20 and 22 a prepulse exceeding the firing voltage of each device, consider the embodiment shown in FIG. 2. If the prepulse power supply produces a pulse of voltage $-V_p$, then the resulting voltages across the two discharge devices 20 and 22 are $-V_p$ and $+(V_p+V_o)$, respectively. If the magnitude of the prepulse voltage $V_p$ exceeds the firing voltage, then the resulting voltage pulse across each discharge device will exceed the firing voltage, and a glow discharge will begin in each device. As explained before, after the glow discharge begins, the prepulse voltage may be removed and the main power supply 12 will sustain the glow discharge.

Figure 3A:
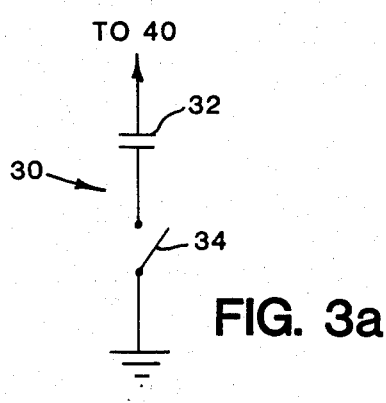
FIG. 3 is a schematic diagram of a prepulse power supply used in the present invention.

Since the prepulse power supply only need supply the prepulse voltage for a short time, it may be readily implemented as shown in FIG. 3a as a capacitor 32 wired in series with a switch 34. In operation, the capacitor should first be charged to a negative voltage greater than the breakdown voltage, and then the switch 34 should be closed. This will apply the high voltage from capacitor 32 across the two discharge devices 20 and 22, thereby initiating a glow discharge in each device. As current begins flowing through the discharge devices, the voltage across capacitor 32 will rapidly drop to zero, but the main power supply 12 will supply sufficient voltage to sustain the discharge.

Figure 4A:
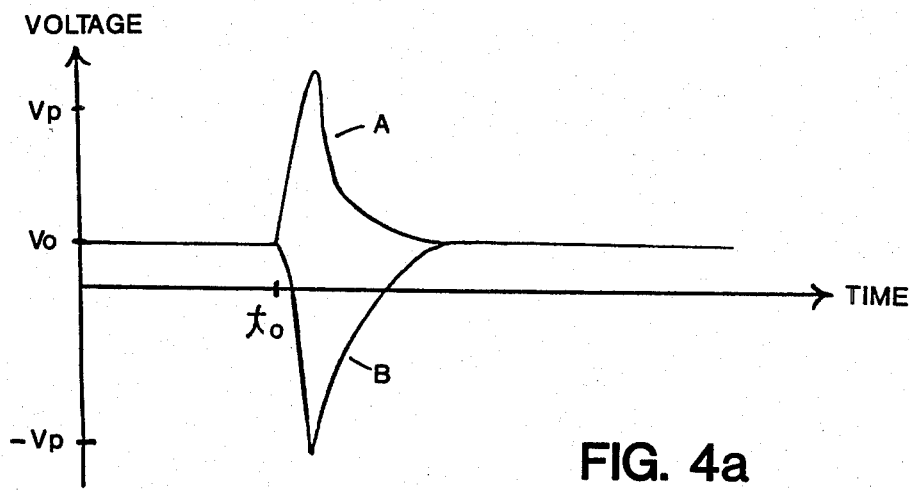
FIG. 4 is a graph of the voltage and current waveforms for the embodiment shown in FIG. 2.
Figure 4B:
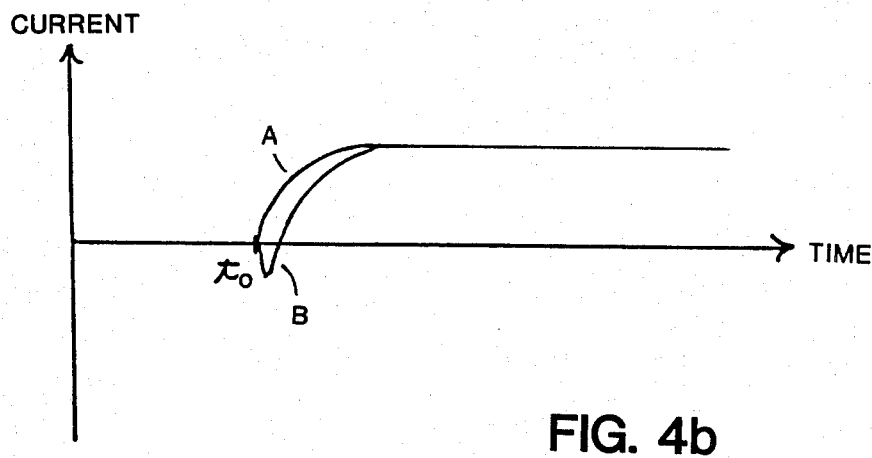

FIGS. 4a and 4b show typical voltage and current waveforms, respectively, for the embodiment just discussed. (The graphs are hypothetical, not based on actual experimentation.) In the Figure, curves A and B represent the first and second discharge devices 20 and 22, respectively. Time $t_o$ represents the time when switch 34 is closed and the prepulse is applied; note the polarity reversal of the voltage across the second device at this time.

Figure 3B:
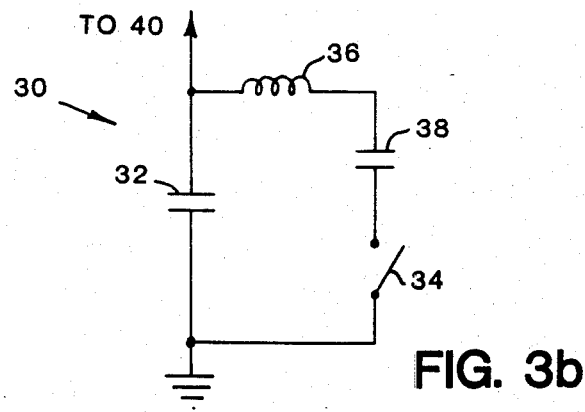

When the switch 34 shown in FIG. 3a is closed, a surge of current flows through the switch limited only by the inductance and resistance in the circuit. This current surge can reduce the lifetime of the switch. FIG. 3b shows a preferred embodiment of the prepulse power supply 30 which overcomes this problem by adding an inductor 36 and a second capacitor 38 whose value is preferably greater than or equal to that of the first capacitor 32.

In operation, if capacitor 38 is charged up to a predetermined initial voltage and then switch 34 is closed, the circuit 30 begins to oscillate sinusoidally as a simple LC tank circuit. A current flows through the capacitors, the inductor and the switch having a sinusoidal waveform with a zero crossing at the time the switch is closed.

If the second capacitor 38 is at least a few times greater than the first capacitor 32, after one half-cycle of oscillation the voltage across the first capacitor will build up to a value approximately double the initial voltage on the second capacitor. (If the value of the second capacitor 38 is smaller, a smaller voltage will appear across the first capacitor 32. For example, if the two capacitors are equal, after one half cycle the voltage across the first capacitor 32 will equal the initial voltage across the second capacitor 38.) If the voltage across the first capacitor 32 exceeds the firing voltage of the discharge devices 20 and 22, a discharge will be initiated in both devices.

An advantage of the preferred embodiment of FIG. 3b over the one in FIG. 3a is that it eliminates current surges through the switch 34. Specifically, the current through the switch 34 builds up sinusoidally according to the time constant established by the inductor 36 and the series-connected capacitors 32 and 38.

The foregoing description of the operation of the invention has been based on the embodiment of FIG. 2 having a single-ended main power supply 12. We will now consider the operation of the preferred embodiment of FIG. 1, which has a balanced main power supply 10.

Referring to FIG. 1, suppose the prepulse power supply 30 produces a pulse of voltage $-V_p$; the resulting voltage across the first and second discharge devices 20 and 22 would be $+(V_p+V_o/2)$ and $-(V_p-V_o/2)$, respectively. These expressions indicate that, in order to initiate a glow discharge in the second device 22, the prepulse must have a voltage $V_p$ greater than the sum of the firing voltage and one-half the main power supply voltage $V_o$. However, a prepulse voltage as much as $V_o$ less than this would suffice to initiate the discharge in the first device 20.

One approach to initiating both glow discharges is to design the prepulse power supply 30 to supply a prepulse voltage greater than the sum of the firing voltage and one-half the main power supply voltage. A preferred alternative approach is to design it to supply a prepulse voltage only slightly greater than the firing voltage minus one-half the main power supply voltage, which would initiate a discharge in the first device, and then reverse the polarity of the prepulse voltage, which would initiate a discharge in the second device.

This polarity reversal can be accomplished using the previously discussed prepulse power supply circuit shown in FIG. 3b, because the second capacitor 38 resonates with the stray inductance in the wiring between it and the discharge devices, causing the voltage to oscillate at the resonant frequency of the circuit. Because the inductance of the wiring is much less than that of inductor 36, this oscillation is much faster than that of the resonant circuit comprising inductor 36 and capacitors 32 and 38.

An alternative approach to initiating discharges in both devices 20 and 22 in spite of the fact that the prepulse power supply 30 produces a lower voltage across the second discharge device 22 than the first discharge device 20 is to design the second discharge device 22 to have a lower firing voltage than the first device 20. For example, this could be accomplished by making the interelectrode gap greater in the first device 20 than in the second device 22.

Although other applications for tandem glow discharge devices may exist, the present invention was originally conceived as a means for pumping gas discharge lasers. Such lasers conventionally have a single pair of electrodes 24 and 26 for producing a glow discharge which excite the laser gain medium. Also, such lasers typically emit light only in brief pulses, so that their power supplies only need to supply power to the discharge electrodes for the desired duration of the laser pulse.

Accordingly, a power supply for a gas discharge laser conventionally consists of one or more capacitors which are charged up to a voltage greater than the firing voltage of the glow discharge device. The duration of the glow discharge is determined by the time it takes for the power supply capacitors to discharge below the sustaining voltage of the glow discharge device. The power supply capacitors are most commonly constructed of parallel metal plates separated by water, but may also be constructed of rolled-up alternating sheets of metal and a solid dielectric.

The same sort of conventional charged-capacitor power supply can be used to implement the main power supply 10 or 12 of the present invention. However, since in the present invention a separate prepulse power supply provides the firing voltage for the discharge devices, the main power supply capacitors need only be charged up to the sustaining voltage. For example, FIG. 1 shows the power supply 10 as having two capacitors 64 and 66 that can be charged up by a voltage source, not shown, to supply the bipolar output voltage at terminals 14 and 16.

Figure 5:
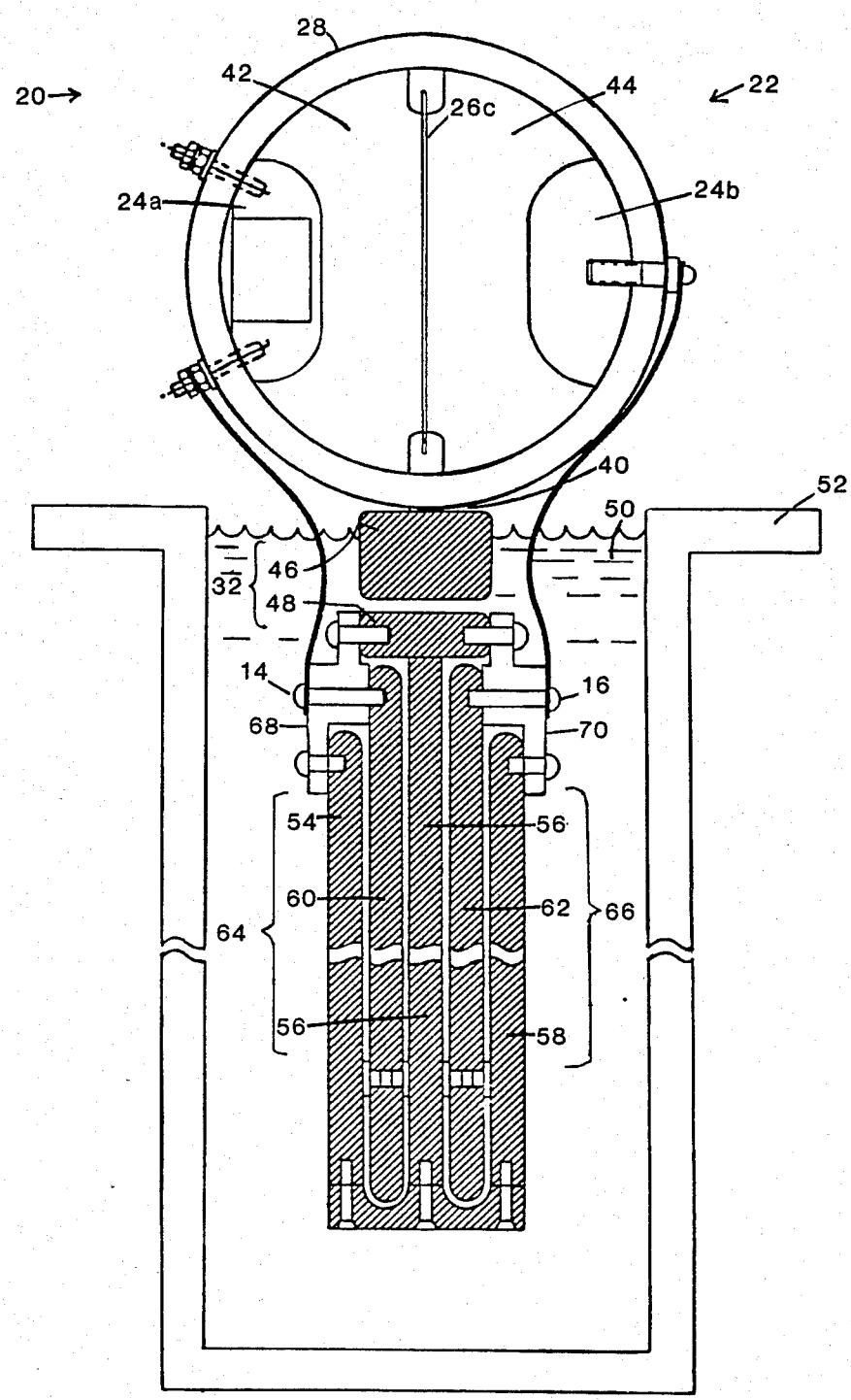
FIGS. 5, 6 and 7 are transverse sectional views of three different embodiments of gas discharge lasers employing tandem discharge devices according to the present invention.

FIG. 5 shows a prototype single-shot gas discharge laser having two discharge devices 20 and 22 operating in tandem according to the present invention. During actual tests the laser produced 4.2 joules of optical energy with an efficiency of 4%.

The cylindrical envelope 28 is filled with a gas mixture of 4 atm neon, 2.4 Torr xenon, and 2 Torr HCl. Two outer electrodes 24a and 24b are mounted on opposite inner walls of the envelope 28. A flat central electrode 26c longitudinally bisects the cylindrical envelope 28 in a plane halfway between the other two electrodes 24a and 24b, thereby forming first and second discharge cavities 42 and 44 on either side of the central electrode. Electrodes 24a and 26c and gas-filled cavity 42 therebetween together constitute the first discharge device 20, and electrodes 24b and 26c and cavity 44 constitute the second discharge device 22. The two outer electrodes 24a and 24b connect to positive and negative output terminals 14 and 16, respectively, of the main power supply 10.

One of the outer electrodes 24a preferably has a hollow center to permit X-rays from a conventional external X-ray source, not shown, to pass through the electrode X-ray source, not shown, to pass through the electrode to preionize the gas in the discharge cavities 42 and 44 just before a discharge is initiated.

The prepulse power supply 30 includes a first capacitor 32 shown in FIG. 5 and other components located on a separate circuit board, not shown. The first capacitor 32 consists of an upper plate 46 and a lower plate 48 immersed in and separated by a dielectric 50 consisting of water contained in a tank 52. The upper capacitor plate 46 connects directly to the central electrode 26c at junction 40, and the lower plate 48 connects to ground, not shown. In the tested prototype, the first capacitor 32 had a capacitance of 5 nf.

The main power supply 10 includes two capacitors 64 and 66 which are so elongated they behave as transmission lines. The main power supply 10 also includes a voltage source, not shown, for charging the two capacitors.

The two main power supply capacitors 64 and 66 share a common electrode having three parallel plates 54, 56 and 58, the central plate 56 being connected to the lower plate 48 of the prepulse capacitor 32 and to ground, not shown. One main power supply capacitor 64 consists of plates 54 and 56 of the common electrode and a second electrode 60 positioned therebetween and connected via terminal 14 to the outer electrode 24a of the first discharge device 20. The other main power supply capacitor 66 consists of plates 56 and 58 of the common electrode and a second electrode 62 positioned therebetween and connected via terminal 16 to the outer electrode 24b of the second discharge device 22. All the foregoing electrodes are separated by the water dielectric 50.

In the tested prototype, the capacitor electrodes 54–62 are made of nickel-plated aluminum and are mounted on insulators 68 and 70. Each of the two main power supply capacitors 64 and 66 has a value of 590 nf and has a transmission line one-way transit time of 60 nsec.

In operation, a voltage source (not shown) within main power supply 10 charges up each of the two main power supply capacitors 64 and 66 to 12,600 volts. The prepulse power supply 30, implemented as shown in FIG. 3b, then charges prepulse capacitor 32 to 31,500 volts. The latter voltage causes each of the two discharge devices 20 and 22 to fire, and the voltage supplied by the two main power supply capacitors 64 and 66 sustains the gas discharges for 120 nsec.

The gas discharge ceases when the main power supply capacitors 64 and 66 have discharged through the two discharge devices 20 and 22 to the point that the voltage they supply to the two devices is less than the sustaining voltage required to maintain a gas discharge. In the preferred embodiment, this occurs after a time period of twice the one-way transit time of the main power supply capacitors 64 and 66.

Figure 6:
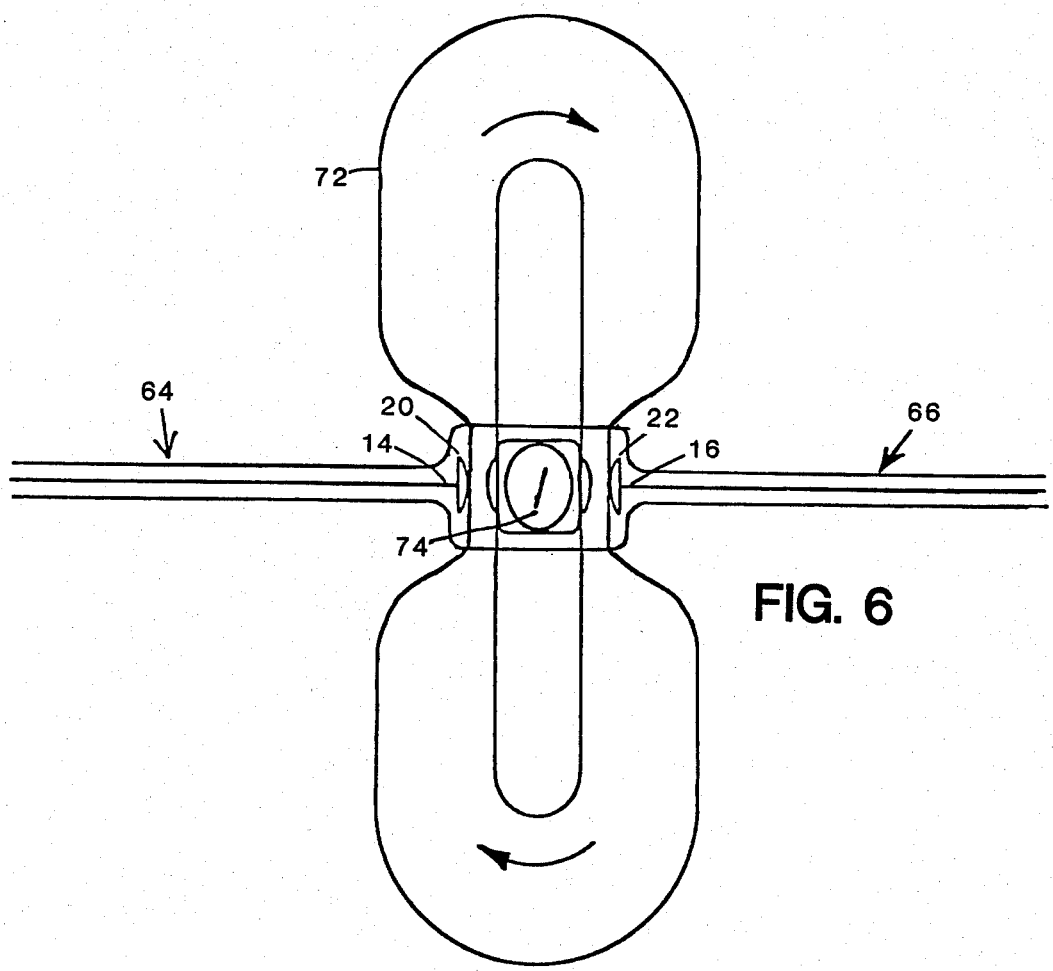

FIG. 6 shows an alternative embodiment of a gas discharge laser having two discharge devices 20 and 22 operating in tandem according to the present invention. This embodiment recirculates the gaseous laser gain medium in order to dissipate heat and allow the laser to be pulsed repetitively. A pump, not shown, circulates the gaseous laser gain medium through a plenum chamber 72 and past each of the two glow discharge devices 20 and 22. The balanced main power supply 10 includes two pairs of capacitors 64 and 66 connected between ground, not shown, and the terminals 14 and 16 which connect to devices 20 and 22, respectively. Each capacitor consists of three spaced metal plates separated by a water dielectric, the outer plates being grounded. The voltage source used to charge up the capacitors is not shown, nor is the prepulse power supply 30. In the preferred embodiment, a centrally located X-ray source 74 emits X-rays which preionize the gas to accelerate the onset of the glow discharges.

Figure 7:
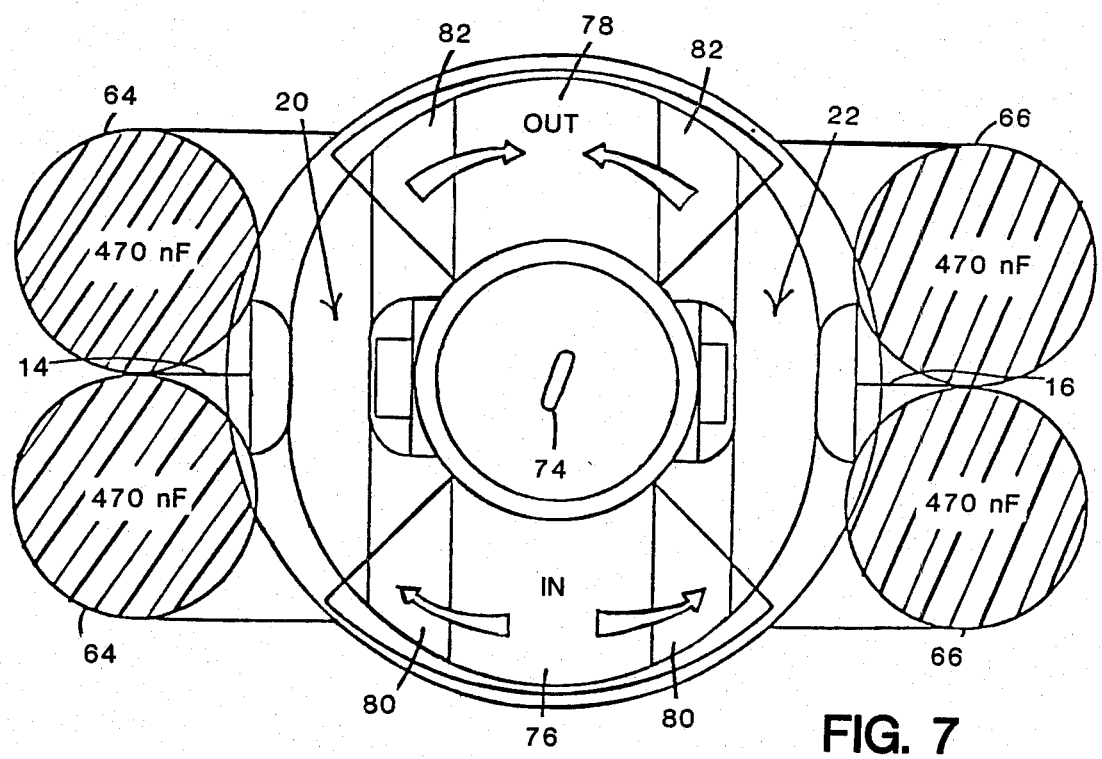

FIG. 7 shows another alternative embodiment of a repetitively pulsed gas discharge laser employing tandem gas discharge devices according to the present invention. This embodiment uses two longitudinally extending plenum chambers 76 and 78 to contain the gaseous laser gain medium. A pump, not shown, circulates the gas from the upstream plenum 76, through the longitudinally extending upstream baffles 80, through the discharge devices 20 and 22, through the downstream baffles 82, and into the downstream plenum 78. The main power supply 10 includes rolled solid-dielectric capacitors 64 and 66 connected to discharge devices 20 and 22, respectively.

I claim:

1. Apparatus for producing an electrical discharge within each of two glow discharge devices, comprising: two glow discharge devices, each discharge device having two opposing electrodes within an envelope filled with gas such that applying a voltage to the electrodes in excess of a characteristic firing voltage causes a glow discharge in the gas that persists as long as the applied voltage exceeds a characteristic sustaining voltage which is less than the firing voltage, the two discharge devices being electrically connected in series to form a series circuit, and the electrical connection point between the two discharge devices being termed a node;

a main power supply, electrically connected across said series circuit, for producing a voltage greater than or equal to the sum of the respective sustaining voltages of the two discharge devices, so that the main power supply voltage sustains the glow discharge in both discharge devices after the prepulse power supply initiates the glow discharge; and a prepulse power supply, electrically connected to said node, for applying respective voltages across each of the two discharge devices greater than the respective firing voltages of the discharge devices, the voltages applied to each discharge device being sustained long enough to initiate a glow discharge in that device, and the voltages being applied to the two devices within a short enough time interval of each other so that the glow discharge in one device begins while the glow discharge in the other device is continuing.

2. Apparatus according to claim 1, wherein said voltages applied to the two discharge devices by the prepulse power supply are applied to the two devices simultaneously, are of opposite polarity, and are each respectively greater than the firing voltage of the respective discharge device.

3. Apparatus according to claim 1, wherein the prepulse power supply produces at said node a voltage of alternating polarity having a magnitude such that when the node voltage has one polarity the voltage applied to one discharge device exceeds its firing voltage, and when the node voltage has the opposite polarity the voltage applied to the other discharge device exceeds its firing voltage.

4. Apparatus according to claim 3, wherein the prepulse power supply comprises a capacitor connected between said node and the main power supply, the capacitor being initially charged to a predetermined voltage, whereby said capacitor resonates with circuit inductance and causes said node voltage to oscillate with alternating polarity.

* * * * *